United States Patent
Huang

(10) Patent No.: US 7,646,879 B2
(45) Date of Patent: Jan. 12, 2010

(54) HEADSET COMMUNICATION UNIT

(75) Inventor: Wei-Hsiang Huang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 798 days.

(21) Appl. No.: 11/420,003

(22) Filed: May 24, 2006

(65) Prior Publication Data

US 2007/0274517 A1 Nov. 29, 2007

(51) Int. Cl.
*H04R 25/00* (2006.01)

(52) U.S. Cl. ............... 381/375; 381/374; 381/381

(58) Field of Classification Search .......... 381/330, 381/370, 374, 375, 376, 378, 379, 381; 379/420.03, 379/430, 433.01, 433.03, 433.13; 455/569.1
See application file for complete search history.

(56) References Cited

U.S. PATENT DOCUMENTS

| | | | |
|---|---|---|---|
| 4,897,873 A * | 1/1990 | Beutler et al. | 379/433.13 |
| 7,110,535 B2 * | 9/2006 | Bodley et al. | 379/430 |
| 7,146,004 B2 * | 12/2006 | Bodley et al. | 379/430 |
| 2004/0052364 A1 | 3/2004 | Bodley | |

* cited by examiner

*Primary Examiner*—Huyen D Le

(57) ABSTRACT

A headset communication unit includes a housing and a microphone arm pivotally connected to the housing. The housing has a first pivotal portion that has a pivotal end and connects a supporting pillar in direction of the pivotal end. The microphone arm has a microphone and an elastic slice member received therein. In the process of the microphone arm rotating from an opening status to a closing status, the elastic slice member contacts the supporting pillar and rotates around the supporting pillar. Among this process, there is a farthest supporting position away from a geometric center of the cross-section of the supporting pillar in all supporting position of the supporting pillar. When the elastic slice member contacts the farthest supporting position, an elastic force stored in the deformed elastic slice is maximized. The elastic force is released to push the microphone arm forward to the closing status.

10 Claims, 6 Drawing Sheets

HEADSET COMMUNICATION UNIT

BACKGROUND OF THE INVENTION

1. Field of the Invention

The present invention relates to a headset communication unit, and more particularly to rotating structures of the headset communication unit.

2. The Related Art

U.S. Pub. No. 2004/0052364 disclosed a headset communication unit. The headset communication unit comprises a housing, an ear hook mounted on the housing and a microphone arm pivotally connected to the housing. The housing has a pair of opposite first pivotal portions disposed thereon.

The microphone arm pivotally connected to the housing rotates between an opening status and a closing status. The microphone arm comprises an upper housing and a lower housing combined with the upper housing. A microphone and a torsion spring are contained between the upper housing and the lower housing. The lower housing has a connecting end and a tail end and has a pair of opposite second pivotal portions respectively extending upwardly from the two sides of the connecting end. The second pivotal portion has a pivotal hole defined therethrough. A pair of latch cavities are formed at the top and the bottom ends of the wall of the second pivotal hole. The second pivotal hole pivotally connects with one end of a pivotal axle. A pair of latch portions extend from the top and bottom ends of the end of the pivotal axle. The latch portion is held in the respective latch cavity to prevent the pivotal axle from rotating relative to the second pivotal portion. The other end of the pivotal axle pivotally connects with the corresponding first pivotal portion of the housing. The pivotal axle further has a penetrating hole defined in the axle center therethrough.

The torsion spring is approximate V-shaped and comprises a pair of elastic arms respectively bending and extending into the corresponding penetrating hole of the pivotal axle. In the process of the microphone arm rotating from the opening status to the closing status, the pivotal axle moves outwardly or inwardly.

However, the structures that enable the microphone arm to rotate around the housing in the above headset communication unit need the corresponding latch structures between the second pivotal portion and the pivotal axle to prevent the pivotal axle from rotating relative to the second pivotal portion. In the process of the pivotal axle rotating following the second pivotal portion and the pivotal axle moving outwardly and inwardly, an interaction force is produced between the latch cavity and the latch portion. As time passes, some bad conditions such as looseness will be produced between the latch structures. As a result, the microphone arm will can not rotate around the housing reliably. Besides, the above structures mentioned are comparatively complex.

SUMMARY OF THE INVENTION

An object of the present invention is to provide a headset communication unit. The headset communication unit comprises a housing, an ear hook mounted on the housing and a microphone arm pivotally connected to the housing. The housing has a first pivotal portion that has a pivotal end and connects a supporting pillar in direction of the pivotal end. The microphone arm is pivotally connected to the first pivotal portion housing and rotates between an opening status and a closing status. The microphone arm comprises an upper housing and a lower housing. A containing room is formed between the upper housing and the lower housing. The containing room contains a microphone and an elastic slice member. In the process of the microphone arm rotating from the opening status to the closing status, the elastic slice member contacts the supporting pillar and rotates around the supporting pillar. Among this process, there is a farthest supporting position away from a geometric center of the cross-section of the supporting pillar in all supporting position of the supporting pillar supporting the elastic slice member. When the elastic slice member contacts the farthest supporting position, an elastic force stored in the deformed elastic slice is maximized. The elastic force is released to push the microphone arm forward to the closing status.

As apparent from the above description, the structures of the elastic slice member rotating around the supporting pillar provide an elastic force to push the microphone arm to rotate between the opening status and the closing status, which is reliable and uncomplicated.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
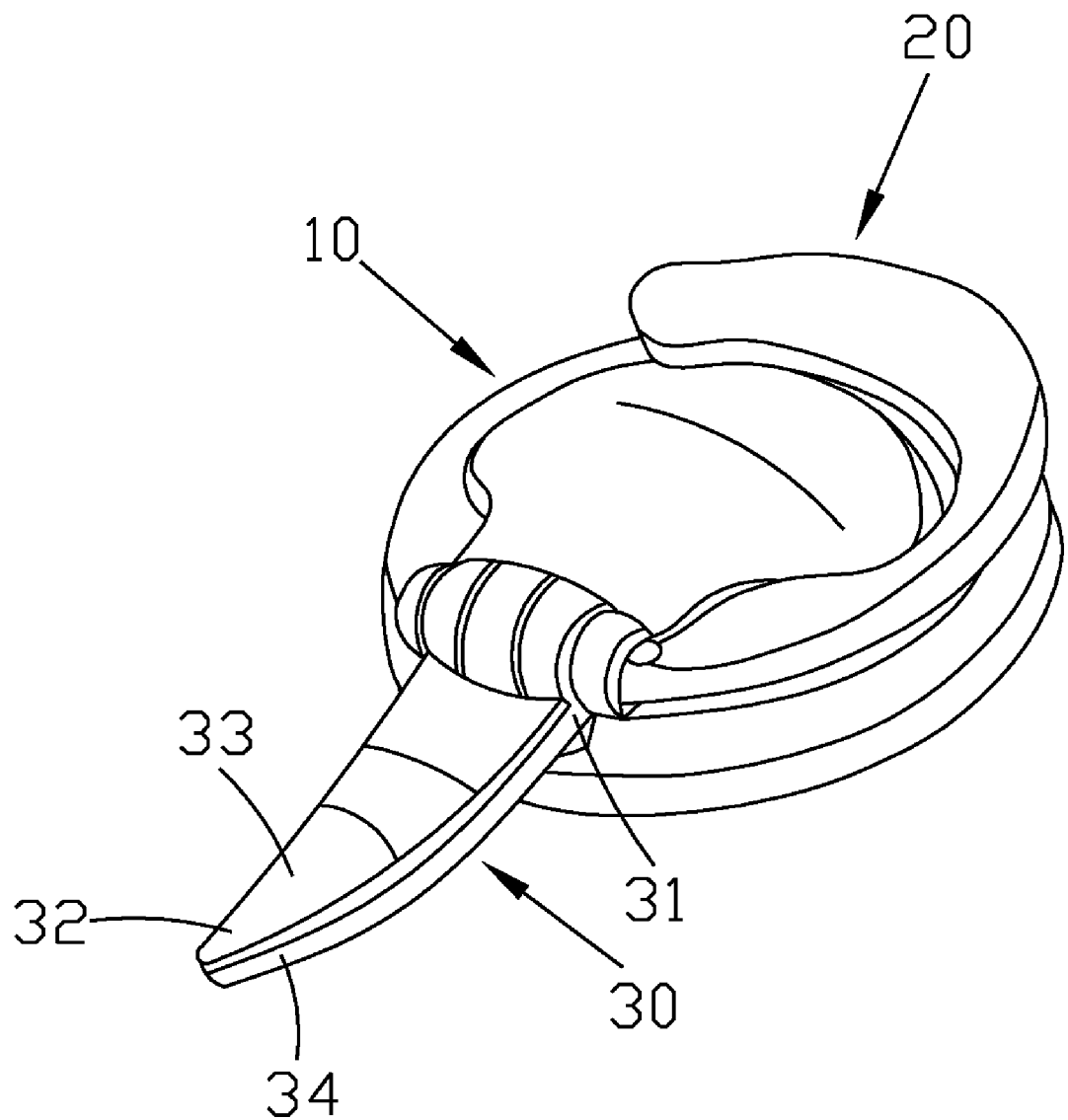
FIG. 1 is a perspective view of a headset communication unit in accordance with the present invention.
Figure 2:
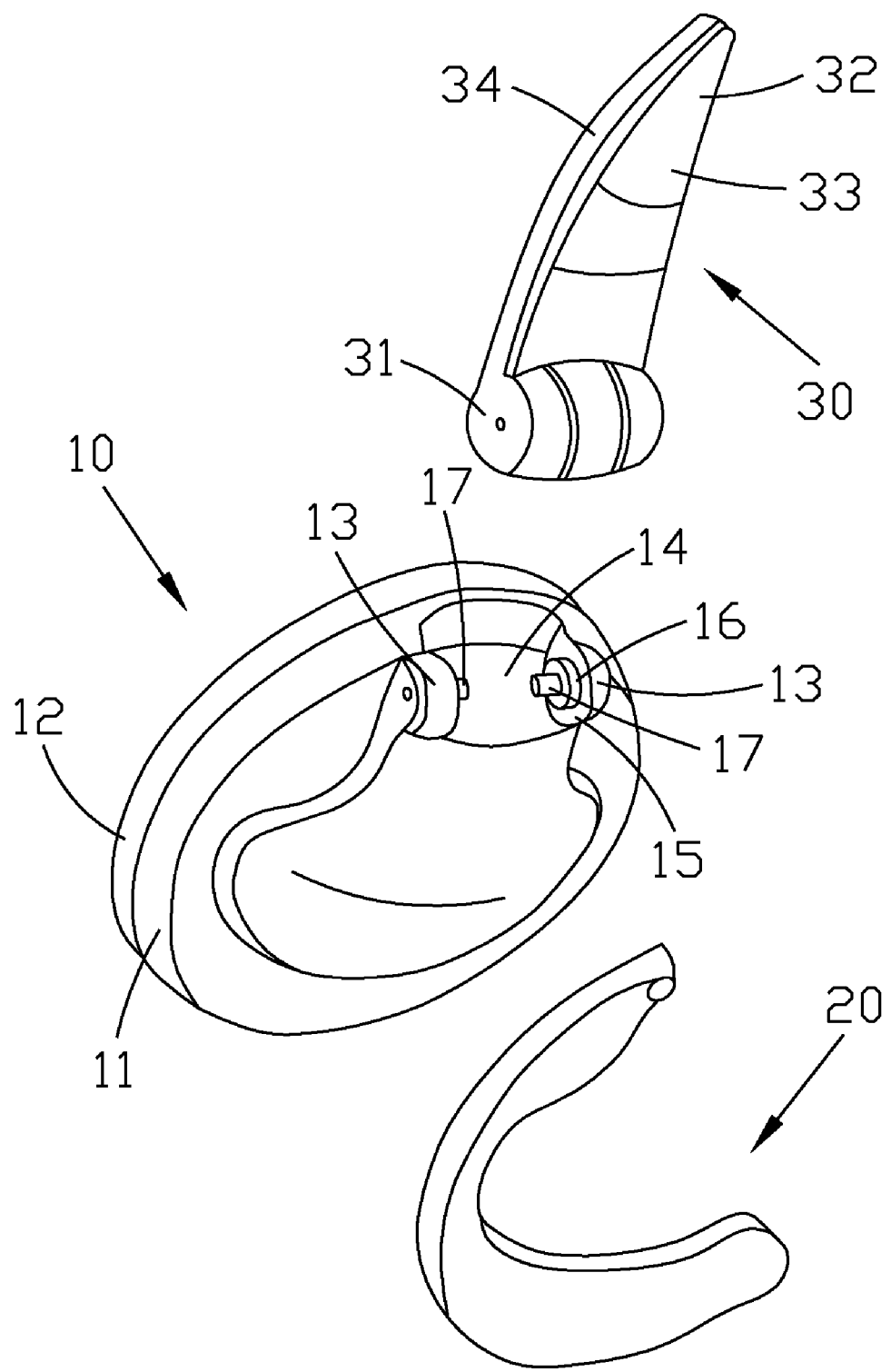
FIG. 2 is an exploded perspective view of the headset communication unit as shown in FIG. 1.

With reference to FIG. 1 and FIG. 2, a headset communication unit 100 in accordance with the present invention comprises a housing 10, an ear hook 20 mounted on the housing 10 and a microphone arm 30 pivotally connected to the housing 10.

Referring to FIG. 2 again, the housing 10 comprises an inside housing 11 and an outside housing 12. A receiving room (not shown) is formed between the inside housing 11 and the outside housing 12. The receiving room receives a transducer and a battery (not shown) therein. The inside housing 11 has a pair of opposite first pivotal portions 13 disposed on one end of the outside thereof. A rotating room 14 is formed between the pair of first pivotal portions 13. The first pivotal portion 13 has a pivotal end 15 and connects a pivotal axle 16 at the pivotal end 15. The pivotal axle 16 connects a supporting pillar 17. In this embodiment, the supporting pillar 17 is a pillar that has an oval-shaped cross-section. But, other shaped pillar with the apogee and the perigee is adapted to the present invention.

Figure 3:
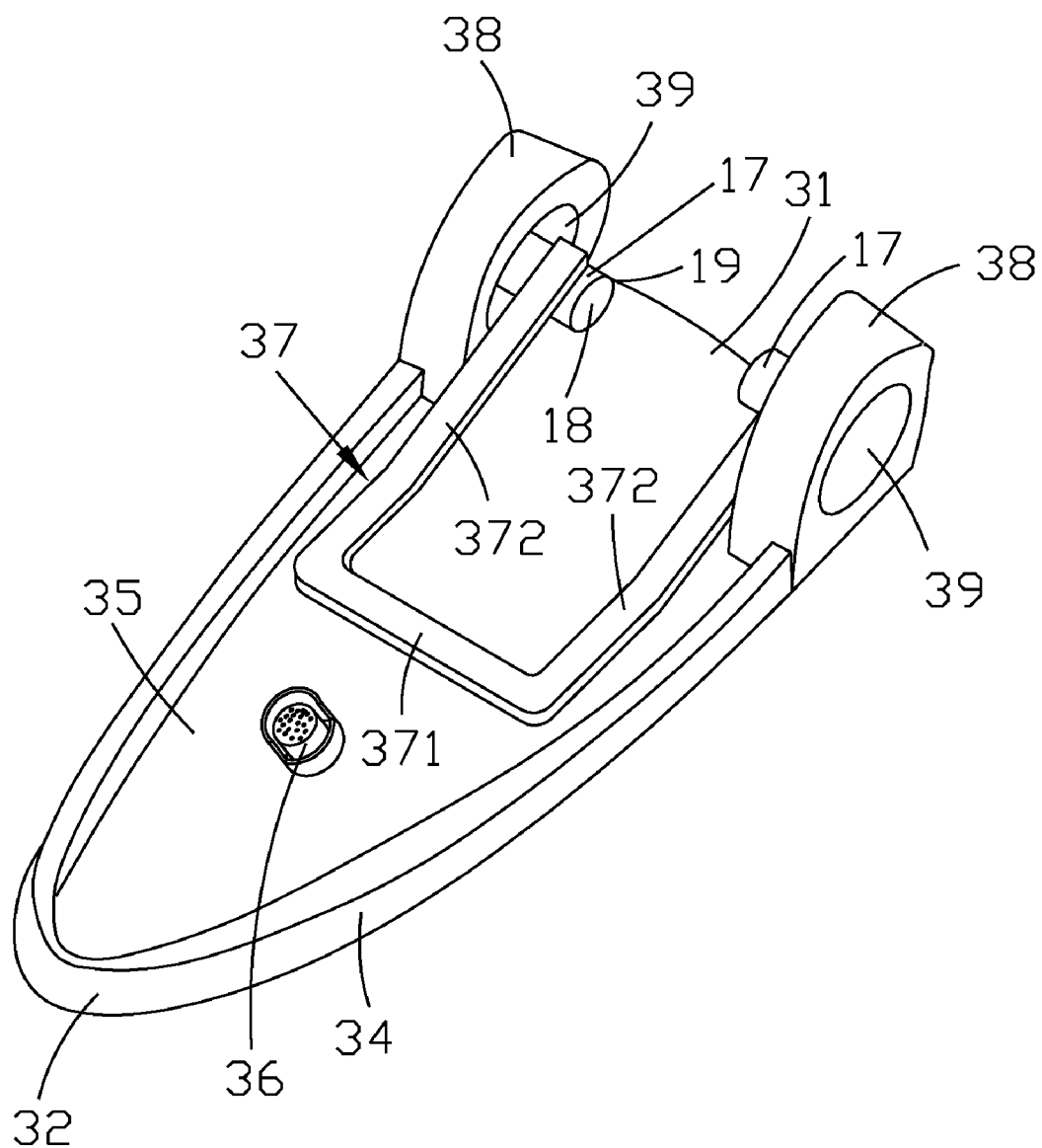
FIG. 3 is a partial perspective view showing the position relation between an elastic slice member of the microphone arm and a supporting pillar as shown in FIG. 2, when the microphone arm with the upper cover removed is in an opening status as shown FIG. 1.

With referring to FIG. 2 and FIG. 3, the microphone arm 30 pivotally connected to the housing 10 rotates in the rotating housing 14 between an opening status and a closing status. The microphone arm 30 comprises an upper housing 33 and a lower housing 34 combined with the upper housing 33. A containing room 35 is formed between the upper housing 33 and the lower housing 34. The containing room 35 contains a microphone 36 and an elastic slice member 37. The lower housing 34 has a connecting end 31 and a tail end 32 and has a pair of opposite second pivotal portions 38 respectively extending upwardly from the two sides of the connecting end 31. The second pivotal portion 38 has a pivotal hole 39 defined therethrough. The pivotal hole 39 pivotally connects with the pivotal axle 16. The supporting pillar 17 extends into the containing room 35 from the pivotal hole 39.

In this embodiment, the elastic slice member 37 is an approximate U-shaped elastic frame. The elastic frame comprises a base plate 371 locating in the approximate middle of the containing room 35 and a pair of elastic slices 372 extending towards the connecting end 31 of the lower housing 34 from the two ends of the base plate 371. The elastic slice 372 is bent at the approximate middle to enable the free end of the elastic slice 372 to raise upwardly with a regular angle to contact the lower supporting pillar 17.

Figure 4:
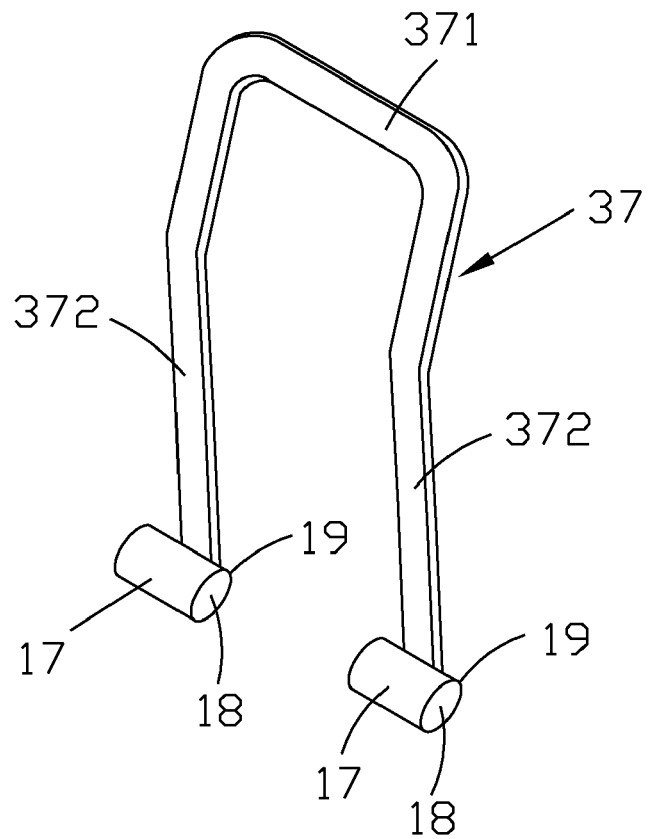
FIG. 4 is a partial perspective view showing an elastic slice of the elastic slice member contacts a farthest supporting position of the supporting pillar away from a geometric center of the supporting pillar owning to the microphone arm as shown in FIG. 3 rotating.
Figure 5:
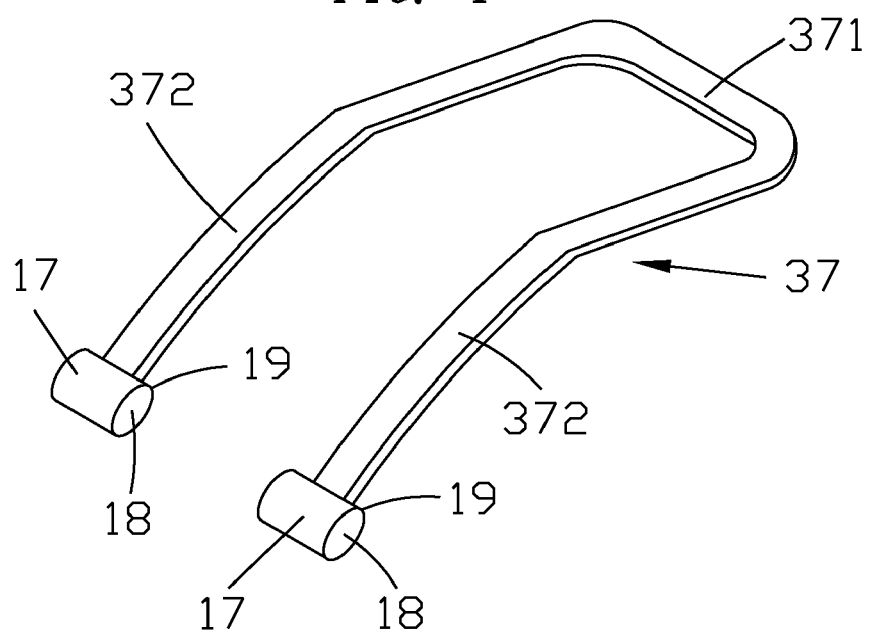
FIG. 5 is a partial perspective view showing the position relation between the elastic slice member and the supporting pillar, when the microphone arm as shown in FIG. 3 rotating to a closing status.

Referring to FIG. 3 to FIG. 5, in the process of the microphone arm 30 rotating around the pivotal axle 16 from the opening status to the closing status, the end of elastic slice 372 contacts the supporting pillar 17 and rotates around the supporting pillar 17. Among this process, there is a farthest supporting position 19 away from a geometric center 18 of the cross-section of the supporting pillar 17 in all supporting position of the supporting pillar 17 supporting the elastic slice 372. When the end of the elastic slice 372 contacts the farthest supporting position 19, an elastic force stored in the deformed elastic slice 372 is maximized. The elastic force is released to push the microphone arm 30 forward to the closing status. In the process of the microphone arm 30 rotating around the pivotal axle 16 from the closing status to the opening status, a same accident will happen.

Figure 6:
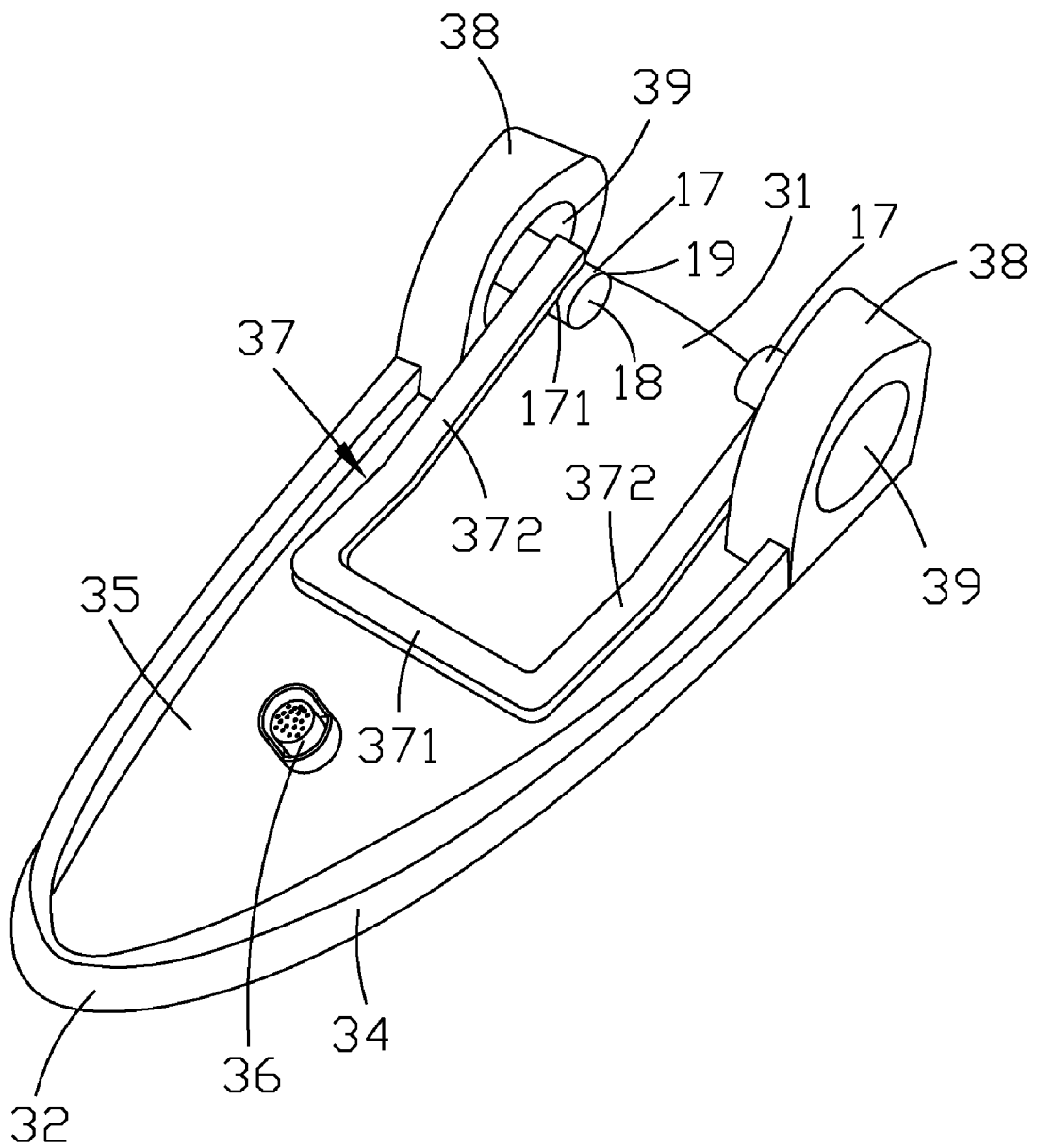
FIG. 6 is a partial perspective view showing the position relation between the elastic slice member of the microphone arm and an improved supporting pillar in a second embodiment of the present invention, when the microphone arm with the upper cover removed is in an opening status as shown FIG. 1.
Figure 7:
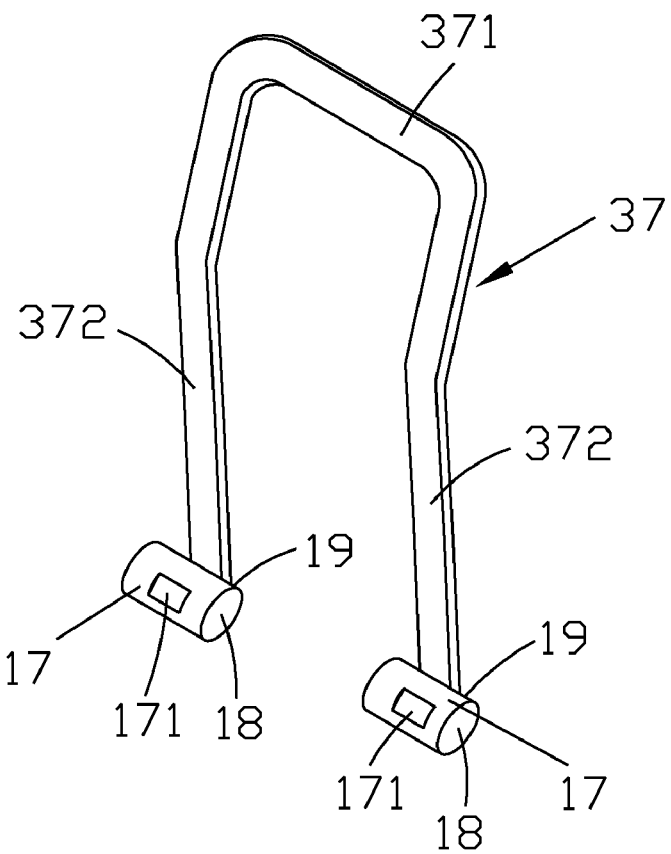
FIG. 7 is a partial perspective view showing an elastic slice of the elastic slice member contacts a farthest supporting position of the supporting pillar away from a geometric center of the supporting pillar owning to the microphone arm as shown in FIG. 6 rotating.
Figure 8:
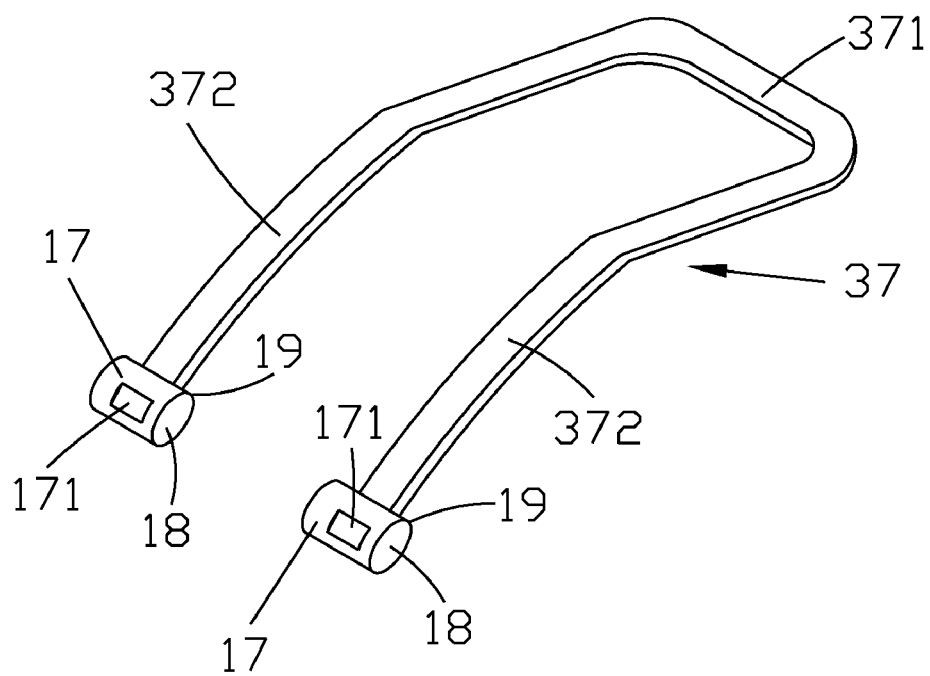
FIG. 8 is a partial perspective view showing the position relation between the elastic slice member and the supporting pillar, when the microphone arm as shown in FIG. 6 rotating to a closing status.

With reference to FIG. 6 to FIG. 8, the improvement of the second embodiment of the present invention on the first embodiment lies in: a first settling plane 171 matching the width of the elastic slice 372 is defined in the supporting pillar 17. When the microphone arm 30 is in an opening status, the end of the elastic slice 372 is positioned in the first settling plane 171 of the supporting pillar 17. In the same way, a second settling plane (not shown) is formed in the supporting pillar 17. When the microphone arm 30 is in a closing status, the end of the elastic slice 372 is positioned in the second settling plane of the supporting pillar 17.

As apparent from the above description, the structures of the elastic slice member 37 rotating around the supporting pillar 17 provide an elastic force to push the microphone arm 30 to rotate between the opening status and the closing status, which is reliable and uncomplicated. Meanwhile, by the first settling plane 171 and the second settling plane positioning the elastic slice member 37, the microphone arm 30 is positioned in the opening or closing status stably.

What is claimed is:

1. A headset communication unit comprising:
a housing having a first pivotal portion that has a pivotal end and connects a supporting pillar in direction of the pivotal end disposed thereon;
an ear hook mounted on the housing; and
a microphone arm pivotally connected to the first pivotal portion of the housing and rotating between an opening status and a closing status, the microphone arm comprising an upper housing and a lower housing, a containing room formed between the upper housing and the lower housing and containing a microphone and an elastic slice member;
wherein in the process of the microphone arm rotating from the opening status to the closing status, the elastic slice member contacts the supporting pillar and rotates around the supporting pillar, among this process, there is a farthest supporting position away from a geometric center of the cross-section of the supporting pillar in all supporting position of the supporting pillar supporting the elastic slice member, when the elastic slice member contacts the farthest supporting position, an elastic force stored in the deformed elastic slice is maximized, the elastic force is released to push the microphone arm forward to the closing status.

2. The headset communication unit as claimed in claim 1, wherein the inside housing has a pair of opposite first pivotal portions disposed on one end of the outside thereof, a rotating room is formed between the pair of first pivotal portions.

3. The headset communication unit as claimed in claim 2, wherein the first pivotal portion connects a pivotal axle at the pivotal end, the pivotal axle connects the supporting pillar.

4. The headset communication unit as claimed in claim 3, wherein the lower housing has a connecting end and a tail end and has a pair of opposite second pivotal portions respectively extending upwardly from the two sides of the connecting end, the second pivotal portion has a pivotal hole defined therethrough, the pivotal hole pivotally connects with the pivotal axle, the supporting pillar extends into the containing room from the pivotal hole.

5. The headset communication unit as claimed in claim 1, wherein the elastic slice member is an approximate U-shaped elastic frame the elastic frame comprises a base plate locating in the approximate middle of the containing room and a pair of elastic slices extending towards the connecting end of the lower housing from the two ends of the base plate, the elastic slice is bent at the approximate middle to enable the free end of the elastic slice to raise upwardly with a regular angle to contact the lower supporting pillar.

6. The headset communication unit as claimed in claim 1, wherein the supporting pillar is a pillar that has an oval-shaped cross-section.

7. The headset communication unit as claimed in claim 6, wherein a first settling plane is defined in the supporting pillar, when the microphone arm is in an opening status, the end of the elastic slice member is positioned in the first settling plane of the supporting pillar.

8. The headset communication unit as claimed in claim 6, wherein a second settling plane is defined in the supporting pillar, when the microphone arm is in an closing status, the end of the elastic slice member is positioned in the second settling plane of the supporting pillar.

9. The headset communication unit as claimed in claim 1, wherein a first settling plane is defined in the supporting pillar, when the microphone arm is in an opening status, the end of the elastic slice member is positioned in the first settling plane of the supporting pillar.

10. The headset communication unit as claimed in claim 1, wherein a second settling plane is defined in the supporting pillar, when the microphone arm is in an closing status, the end of the elastic slice member is positioned in the second settling plane of the supporting pillar.

* * * * *